United States Patent [19]

Niedermann et al.

[11] Patent Number: 5,994,160
[45] Date of Patent: Nov. 30, 1999

[54] PROCESS FOR MANUFACTURING MICROMECHANICAL COMPONENTS HAVING A PART MADE OF DIAMOND CONSISTING OF AT LEAST ONE TIP, AND MICROMECHANICAL COMPONENTS COMPRISING AT LEAST ONE DIAMOND TIP

[75] Inventors: Philipp Niedermann, Neuchatel; Rainer F. Christoph, Peseux, both of Switzerland

[73] Assignee: CSEM-Centre Suisse'd Electronique et de Microtechnique S.A., Neuchatel, Switzerland

[21] Appl. No.: 08/723,232

[22] Filed: Sep. 27, 1996

[30] Foreign Application Priority Data

Sep. 29, 1995 [FR] France .................................. 95 11490

[51] Int. Cl.⁶ .................................................. H01L 21/00
[52] U.S. Cl. ................................ 438/53; 438/50; 438/52
[58] Field of Search ............................ 438/50, 52, 53; 250/306; 33/556; 73/105

[56] References Cited

U.S. PATENT DOCUMENTS

| 3,888,708 | 6/1975 | Wise et al. ................................ 438/53 |
| 5,051,379 | 9/1991 | Bayer et al. .............................. 438/52 |
| 5,066,358 | 11/1991 | Quate et al. .............................. 438/52 |
| 5,204,210 | 4/1993 | Jansen et al. ........................... 430/198 |
| 5,221,415 | 6/1993 | Albretch et al. .......................... 438/52 |
| 5,619,093 | 4/1997 | Glesener et al. ........................ 313/309 |
| 5,811,017 | 9/1998 | Matsuyama .............................. 438/52 |

FOREIGN PATENT DOCUMENTS

| 0414041 | 2/1991 | European Pat. Off. . |
| 4232886 | 5/1992 | Germany . |
| 4314301 | 5/1994 | Germany . |

*Primary Examiner*—Carl Whitehead, Jr.
*Assistant Examiner*—Khanh Duong

[57] ABSTRACT

Process for manufacturing micromechanical components having a part made of diamond, consisting of at least one tip (3a), in which a substrate (8a) is prepared, in order to form an impression (13a) of the shape desired for the part made of diamond; the part made of diamond is produced by chemical vapor deposition of diamond in the impression and is then separated from the substrate. In order to produce the part made of diamond, a primary film of fine diamond particles, of diameter less than 10 nm, suitable to act as seeds for growth of the diamond are deposited on the substrate, on the surface of the impression (13a), before chemical vapor deposition; the diamond film is then grown by vapor deposition; and the substrate (8a) is then at least partly removed.

15 Claims, 9 Drawing Sheets

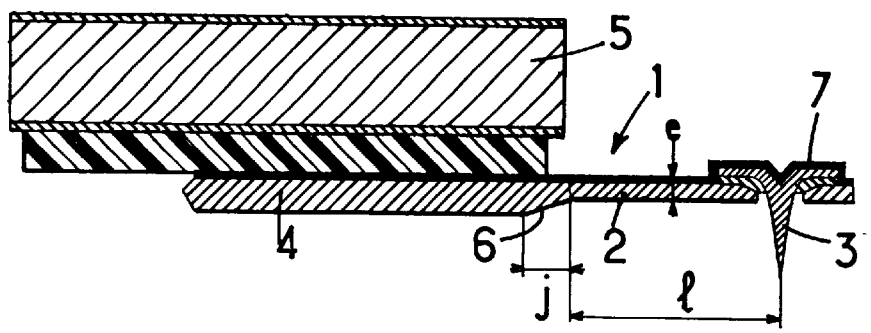
FIG.:1
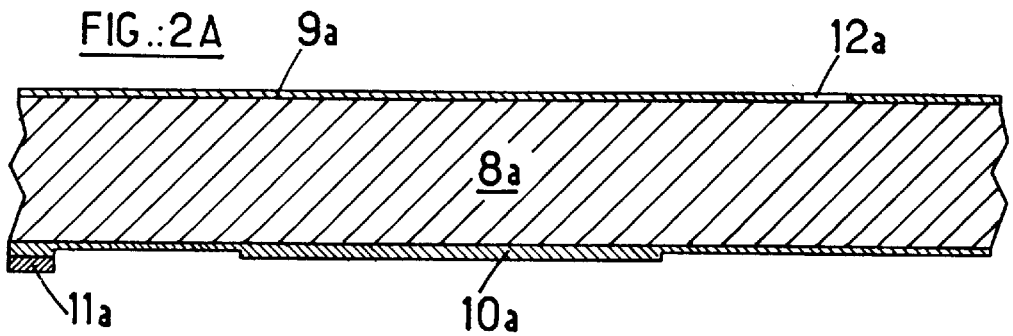
FIG.:2A
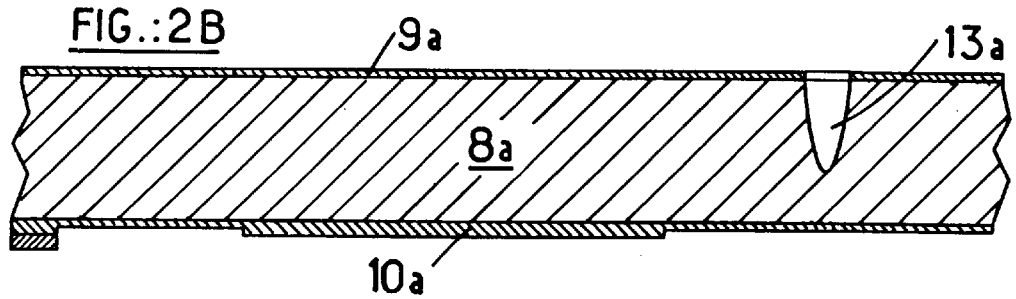
FIG.:2B
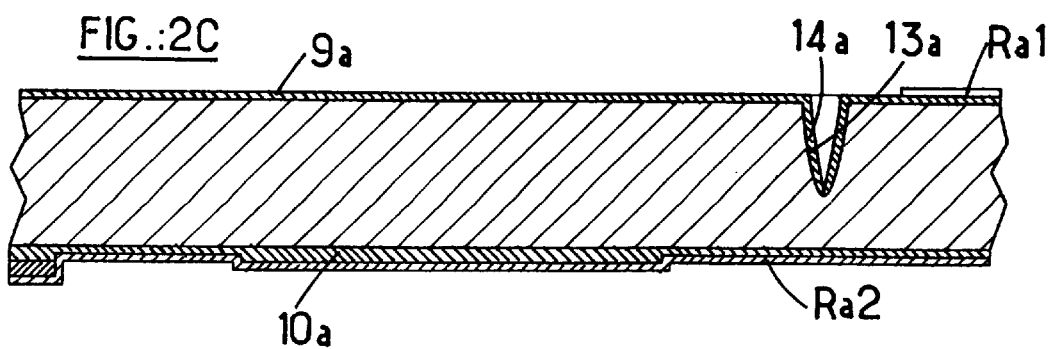
FIG.:2C

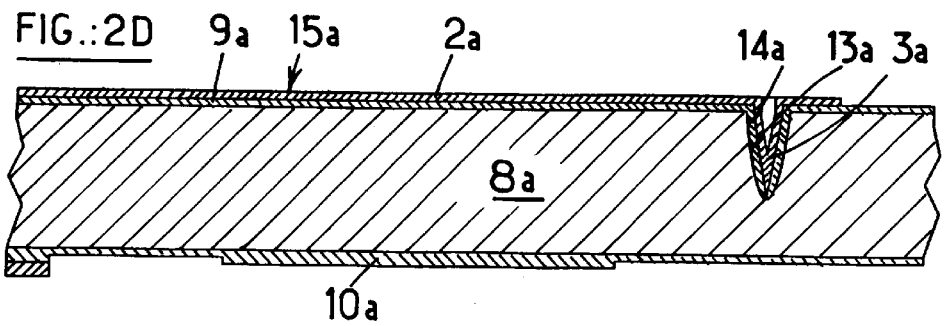
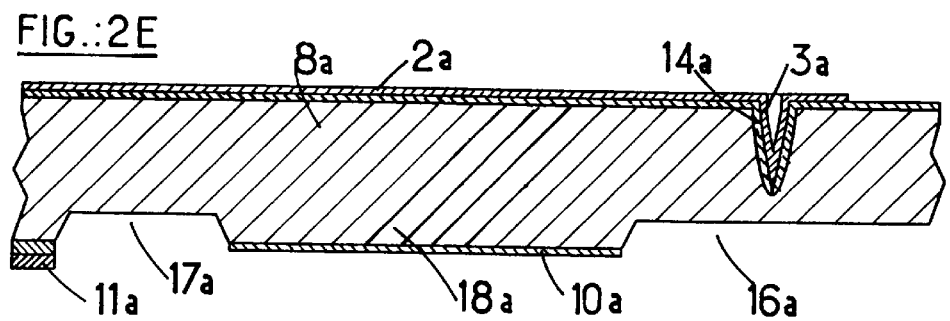
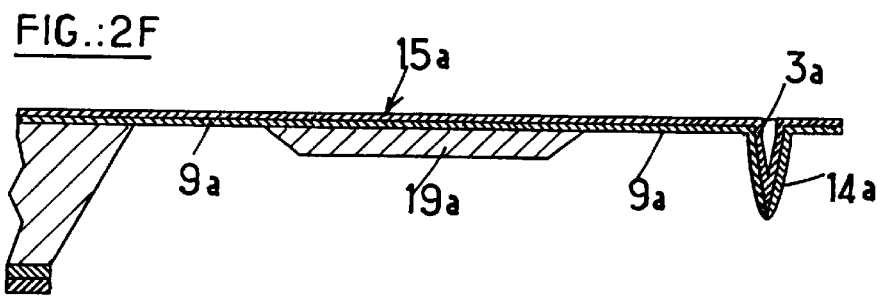
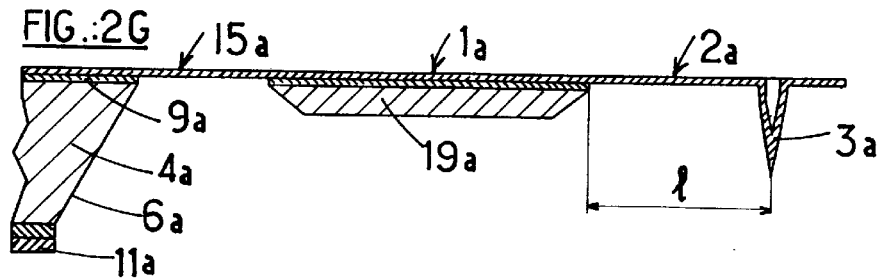

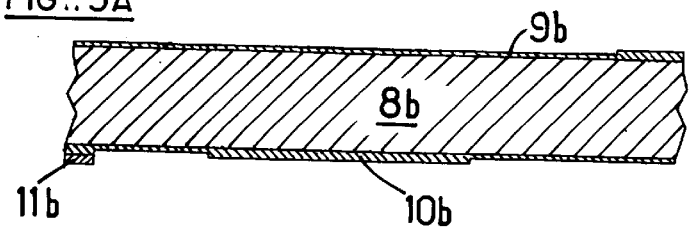
FIG.: 3A
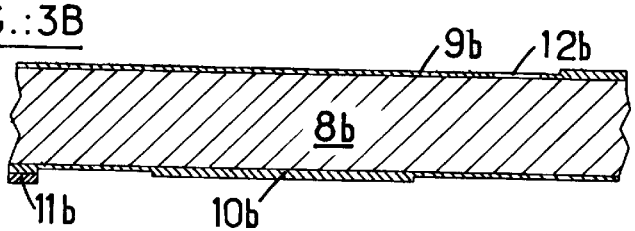
FIG.: 3B
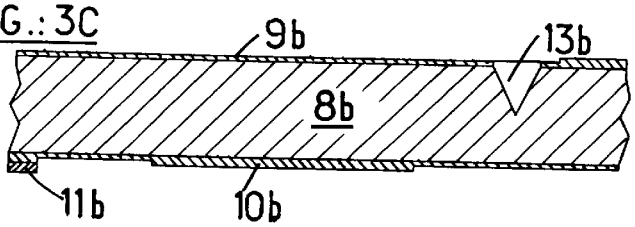
FIG.: 3C
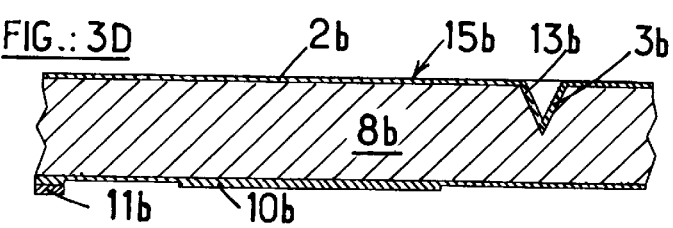
FIG.: 3D
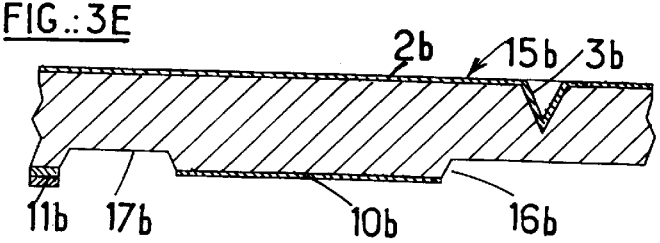
FIG.: 3E
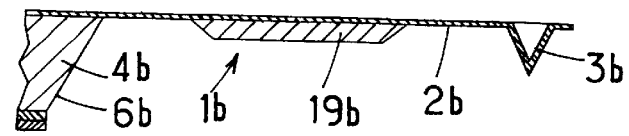
FIG.: 3F

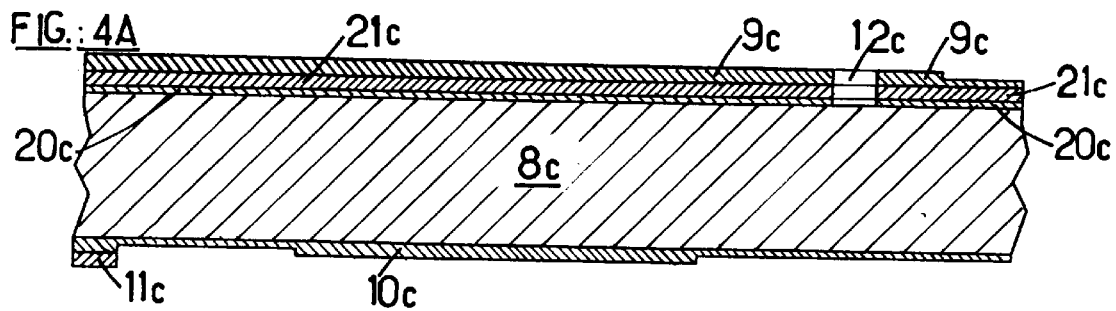
FIG.: 4A
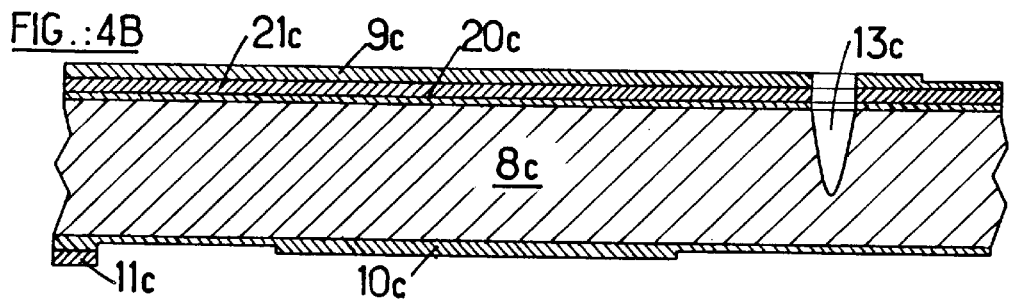
FIG.: 4B
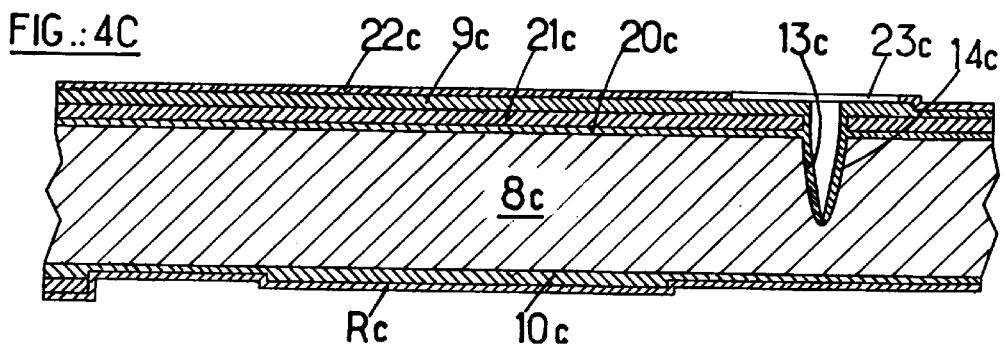
FIG.: 4C
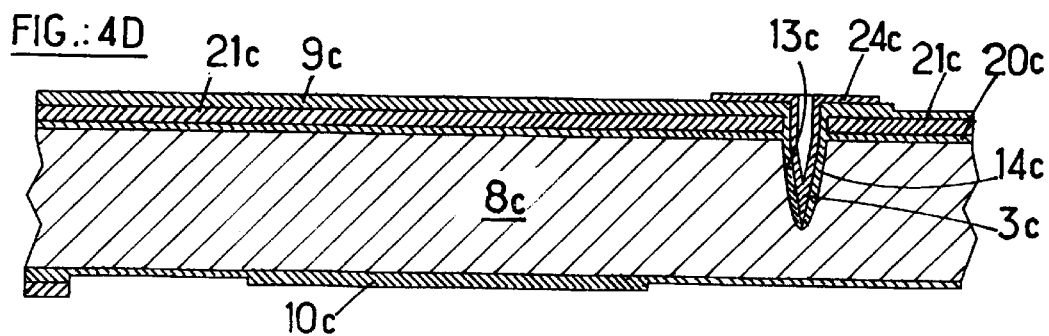
FIG.: 4D

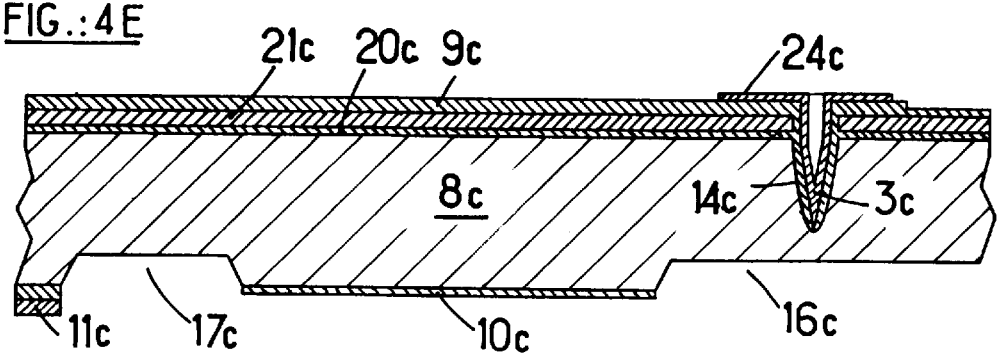
FIG.:4E
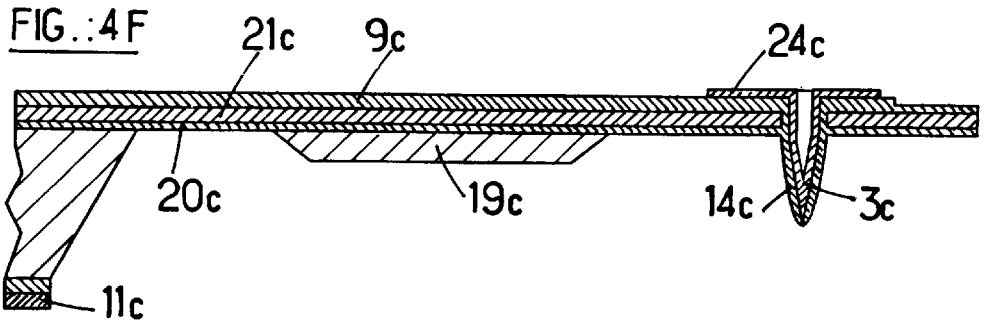
FIG.:4F
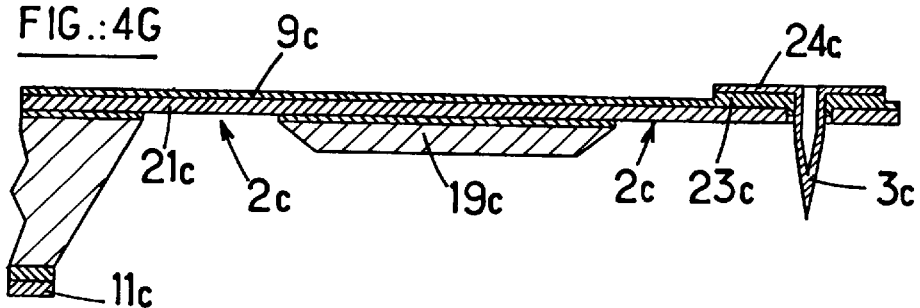
FIG.:4G
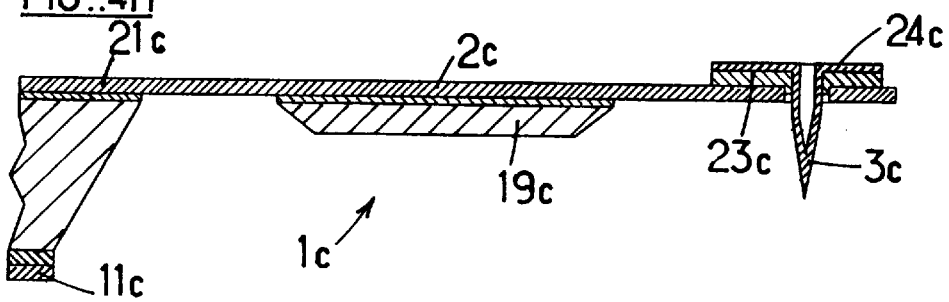
FIG.:4H

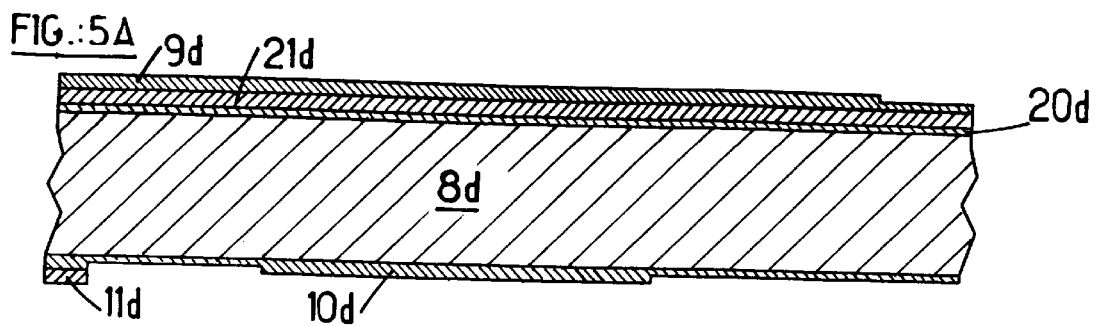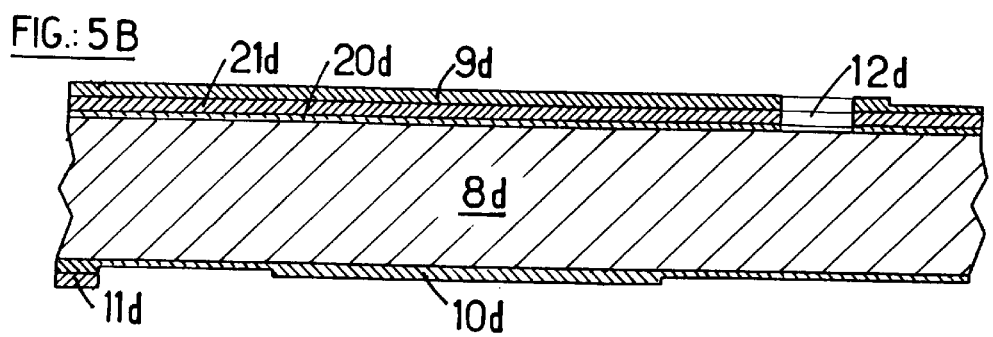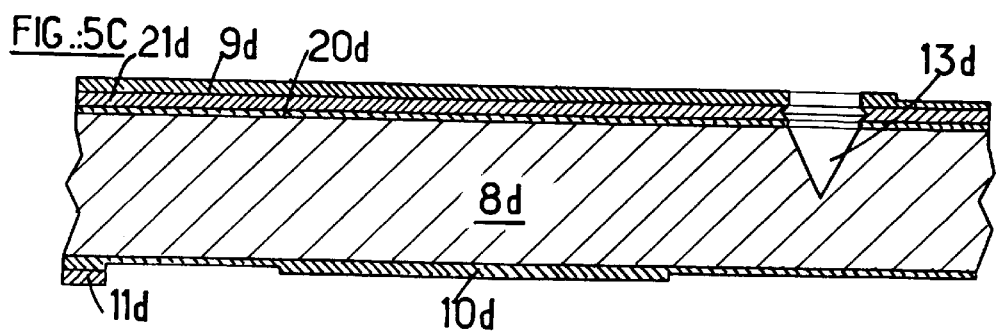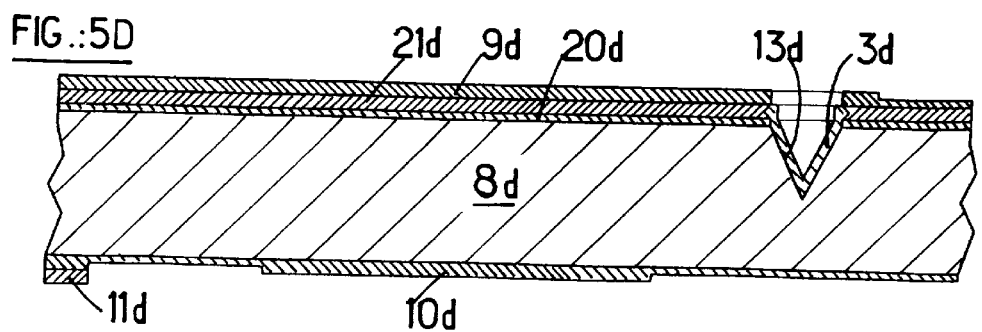

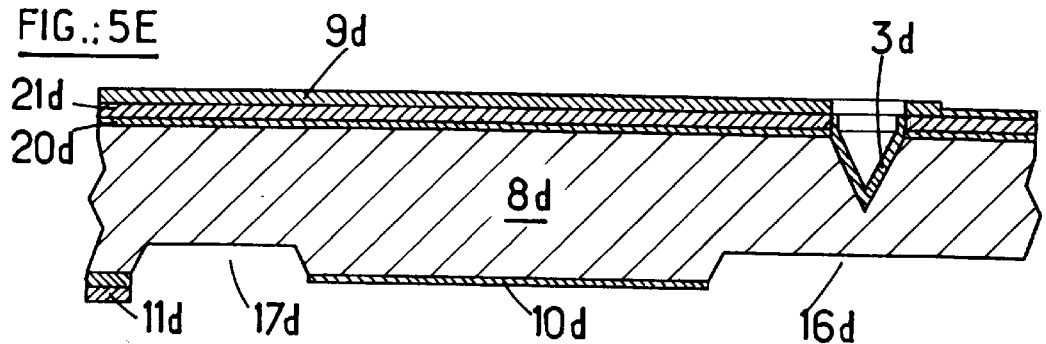
FIG.: 5E
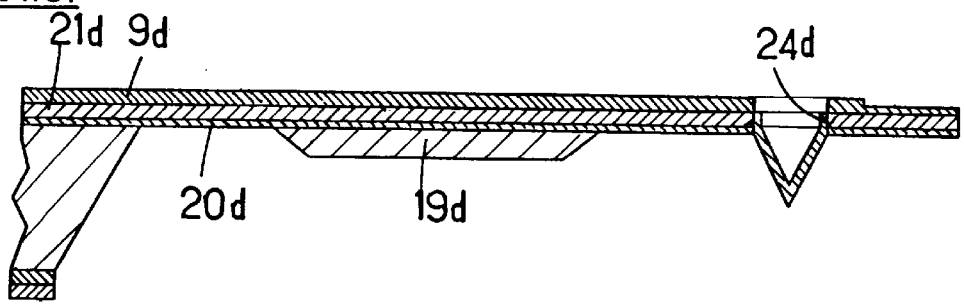
FIG.: 5F
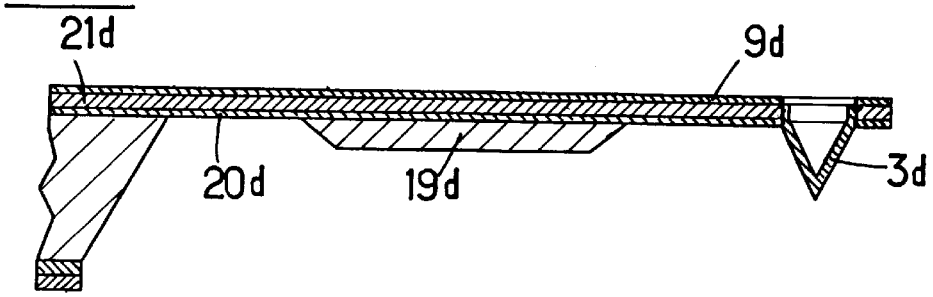
FIG.: 5G
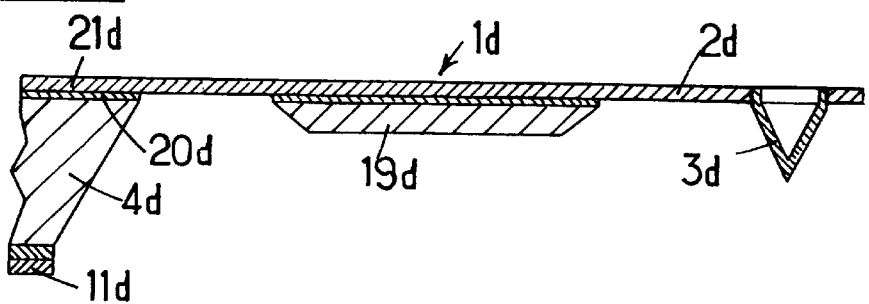
FIG.: 5H

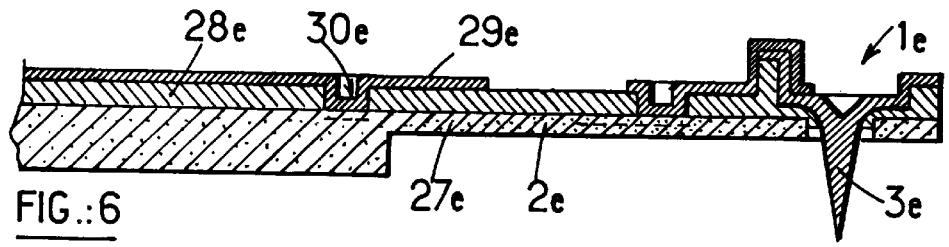
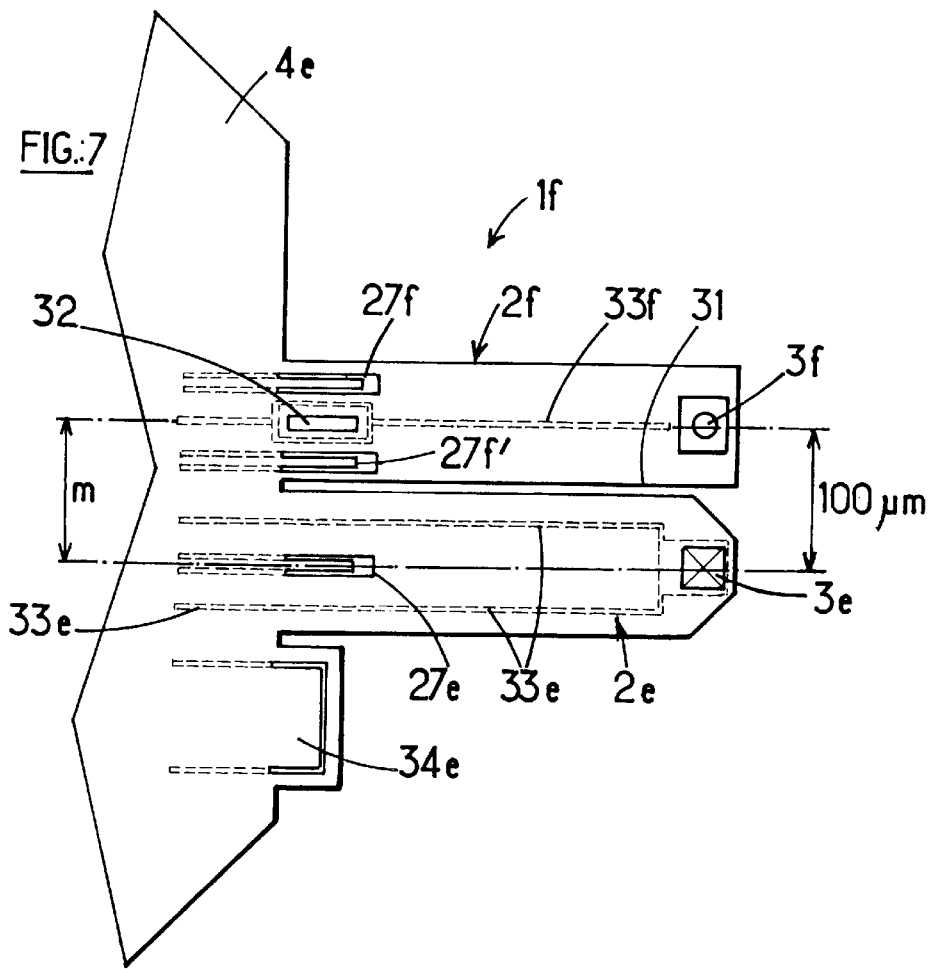
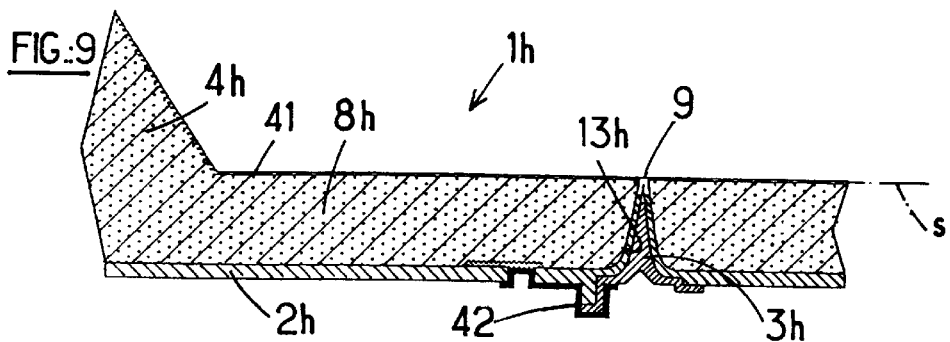

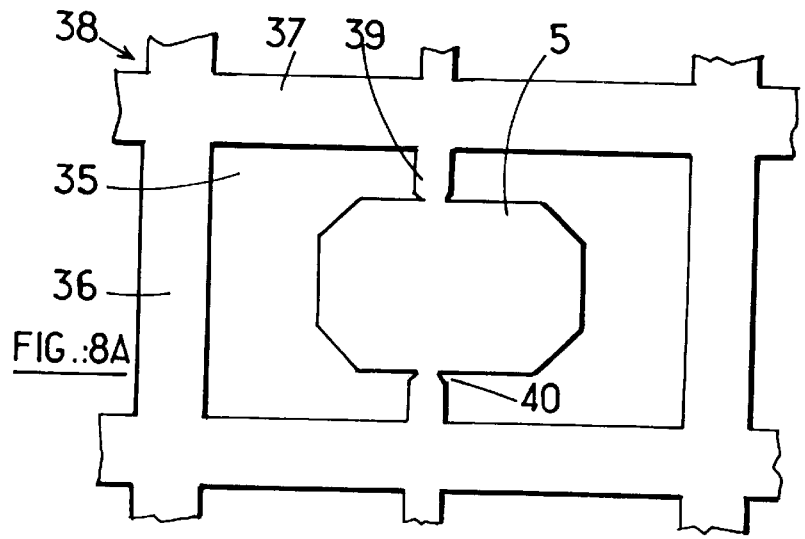
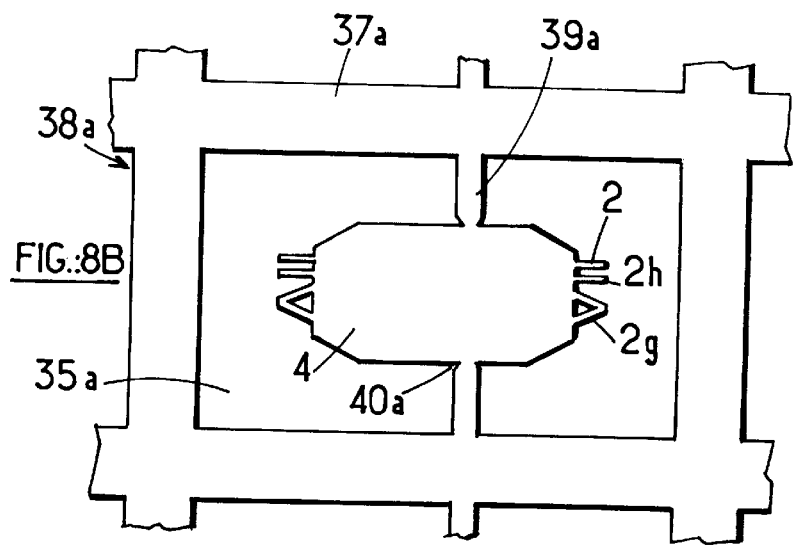
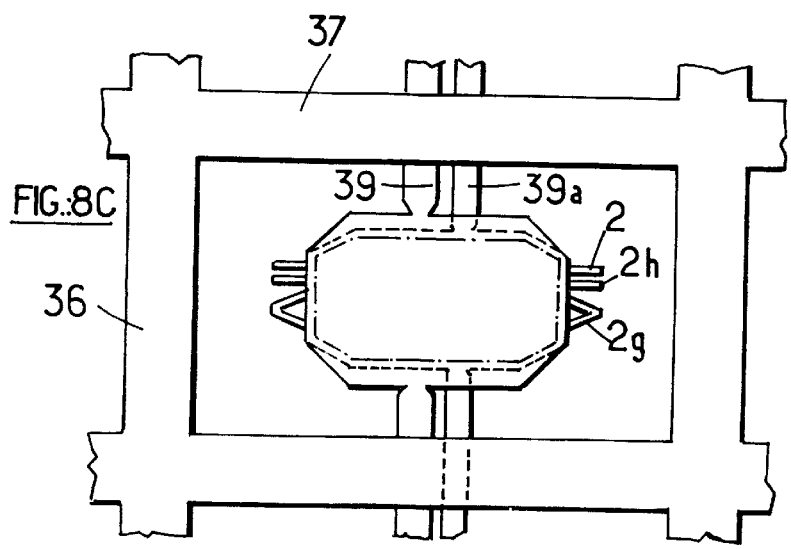

PROCESS FOR MANUFACTURING MICROMECHANICAL COMPONENTS HAVING A PART MADE OF DIAMOND CONSISTING OF AT LEAST ONE TIP, AND MICROMECHANICAL COMPONENTS COMPRISING AT LEAST ONE DIAMOND TIP

BACKGROUND OF THE INVENTION

The invention relates to a process for manufacturing miciromechanical components having a part made of diamond consisting of at least one tip, this process being of the kind in which:

a substrate, generally a silicon substrate, is prepared by micromachining using suitable lithographic and/or wet or dry anisotropic etching techniques, so as to form an impression of the desired shape for the part made of diamond, the part made of diamond is produced by chemical vapor deposition of diamond in the impression and is then separated from the substrate.

The invention relates more particularly, but not exclusively, to such a process for the manufacture of a micromechanical detector for an atomic force microscope or the like.

DESCRIPTION OF THE PRIOR ART

A process of this kind is known, in particular from U.S. Pat. No. 5,221,415 or from EP-B-0,413,041.

In the case of an atomic force microscope, or for similar applications, the diamond tip produced to a precision of appreciably less than one micron is fixed to the end of a lever, the other end of which is fastened to a block which may be moved, by suitable means, by submicron distances in three orthogonal directions. The diamond tip makes it possible to scan the surface of a specimen and produce, by means of sensors which detect the submicron movements of the end of the lever provided with the tip, profiles of the surface topography of the specimen. The forces which may be detected using such a lever-and-tip system are very small, possibly of the order of one nanonewton (nN).

In order to improve the accuracy of the measurement,, it is desirable that the spring constant k of the lever have a suitable value of the order of 1 N/m (1 newton/meter) while the resonant frequency of the lever should be relatively high, especially at least equal to 10 kHz.

Another factor involved in the accuracy and the sensitivity of the micromechanical detector is the radius of curvature of the end of the diamond tip. This radius of curvature, with the processes used currently and employing a diamond tip, has a value of the order of 100 nm (100 nanometers), a value which it is desirable to reduce, in particular for improving the accuracy of surface analysis.

SUMMARY OF THE INVENTION

The object of the invention is therefore, above all, to provide a manufacturing process which makes it possible to obtain a diamond tip whose end has a radius of curvature markedly less than 100 nm and advantageously of the order of 20 nm. The invention also aims to provide a process making it possible to produce the part made of diamond with the tip, under reliable and relatively economical conditions.

The object of the invention is also to provide a manufacturing process which makes it possible to produce the lever under good conditions and to integrate the diamond tip into the lever easily.

According to the invention, the process for manufacturing micromechanical components having a part made of diamond, consisting of at least one tip, of the kind defined previously, is wherein, in order to produce the part made of diamond:

a primary film of fine diamond particles suitable to act as seeds for growth of the diamond are deposited on the substrate, on the surface of the impression, before chemical vapor deposition, the diamond film is then grown by vapor deposition, and the substrate is then at least partly removed.

Laying down fine diamond particles, consisting of small diamond crystals, allows uniform growth of the diamond film during vapor deposition.

The surface density of the fine diamond particles is preferably greater than $10^{10}/cm^2$.

The chemical vapor deposition takes place in a reactor at a temperature of approximately 800° C., especially in the presence of a plasma composed of methane ($CH_4$) and hydrogen ($H_2$).

Preferably, a diamond film having a thickness of the order of one micrometer is produced.

In the case of the manufacture of a component comprising a lever provided with a diamond tip at one end, this lever may itself be made of diamond; according to the process of the invention, the primary film of fine diamond particles is deposited over the entire surface of the impression, including that corresponding to the lever, and the lever and the tip are produced as a single piece made of diamond.

According to another possibility, when the component comprises a lever provided with a diamond tip at one end, the lever may consist of a thin film of a material other than the diamond of the tip, this thin film being fastened to the substrate and being penetrated by the impression before deposition of the diamond so that the diamond tip is bonded to the thin film after deposition of the diamond in the impression.

The thin film, in particular made of the same material as the substrate, may be placed against one face of the substrate, from which it is separated by an intermediate film, especially of oxide in conformity with the technology usually termed "silicon on insulator".

According to another possibility, this thin film consists of part of the substrate, in particular a silicon substrate, in which the diamond structure has been molded. The so-called silicon thin film, intended to form the lever, may be doped, in particular with boron, in order to stop the chemical etching of the silicon, during removal of part of the substrate.

In order to produce a fine diamond tip, a circular or substantially circular window is delimited by a mask, on one face of the substrate, and an impression in the form of a pointed cone is produced by dry etching, especially plasma etching, of the substrate through this window, the deposition of diamond being carried out in this impression. In order to make the impression more pointed before deposition of the diamond, an oxide film may be formed by thermal oxidation on the wall of the impression, which oxide film is then removed after deposition of the diamond.

In order to produce a pyramidal diamond tip, in a mariner known per se, a square window is delimited by a mask on one face of a silicon substrate and an inverted pyramidal impression ((111) plane) is produced by wet etching, especially using KOH, of the silicon substrate.

After deposition of the diamond film, it is covered with a support structure, or a bond is established between this diamond film and an appropriate support.

The substrate may be made of silicon, or of silicon oxide or an equivalent material.

The diamond film may be rendered electrically conductive for some applications or electrically insulating for other applications.

The invention also relates to a micromechanical component comprising a diamond tip, obtained in particular by a process as defined previously, this component being noteworthy the radius of curvature of the end of the diamond tip is less than or equal to 20 nm (20 nanometers).

The component may comprise two, or more than two, diamond tips, in particular one being a fine tip in the form of a pointed cone and the other being in the form of an inverted pyramid. Preferably, the component then comprises two separate levers, fastened to the same base, which are respectively associated with each of the diamond tips.

The pyramidal tip is intended, especially, for producing micro-indentations in a specimen, in particular for measuring hardness; the lever of the pyramidal tip is generally thicker than the lever of the fine tip.

Advantageously, at least one piezoresistive element or a strain gauge is incorporated into the lever in order to measure mechanical stresses on this lever.

The piezoresistive element(s) or strain gauges advantageously consist of regions of the silicon lever(s) having undergone a suitable treatment.

During manufacture, the component is preferably joined by arms, which are intended to be snapped, to sides of a grid carrying several identical components and is intended to be placed against a support grid having the identical geometrical configuration, for the bonding of all the components of a grid to all the supports of a grid, in particular by adhesive bonding or by soldering.

According to another application, the component is equipped with a fine diamond tip in the form of a sharply-pointed cone and this tip is placed as an electrode in a similarly shaped cavity made in a film of suitable material in order to form an electron source.

The invention consists, apart from the arrangements explained hereinabove, of a certain number of other arrangements which will be explained in more detail hereinbelow with regard to embodiments which are described with reference to the drawings appended hereto but which are in no way limiting.

DESCRIPTION OF THE DRAWINGS

Of these drawings,

FIG. 1 is a diagram in elevation of a lever which is provided with a diamond tip, according to the invention, and fixed under a support.

FIGS. 2A to 2G are diagrams illustrating successive steps in the process of the invention for the manufacture of a component comprising a fine tip and a lever made of diamond.

FIGS. 3A to 3F are diagrams illustrating the steps in the process according to the invention for the manufacture of a component comprising a pyramidal tip and a lever made of diamond.

FIGS. 4A to 4H are diagrams illustrating the successive steps in the process for the manufacture of a component comprising a fine tip made of diamond and a lever made of silicon.

FIGS. 5A to 5H are diagrams illustrating the successive steps in the process for the manufacture of a component comprising a pyramidal tip made of diamond and a lever made of silicon.

FIG. 6 is a longitudinal vertical diagrammatic section of a component comprising a lever and a tip made of diamond according to the invention, equipped with a piezoresistive element.

FIG. 7 is a diagrammatic plan view of a component comprising two separate levers fastened to the same base and respectively equipped with a fine tip and with a pyramidal tip, as well as with strain gauges.

FIGS. 8A to 8C are diagrams illustrating the assembly of micromechanical components and of supports arranged in grids.

Finally, FIG. 9 is a diagram of an electron source equipped with a fine diamond tip.

DESCRIPTION OF THE PREFERRED EMBODIMENTS

Shown diagrammatically in FIG. 1 may be seen a micromechanical component 1 comprising a lever 2 (or beam) to one end of which is fixed a diamond tip 3. The end of the lever 2 remote from the tip 3 is fastened to a base 4 which is thicker and fixed under a larger-sized support 5.

FIG. 1 is drawn on a very large scale and, in order to explain the ideas, the orders of magnitude of the dimensions of the component are recalled hereinbelow.

The distance I between the end of the tip 3 and the beginning of the embedment region of maximum cross section of the base 4 is about 500 $\mu$m (500 micrometers). The length j of the transition region 6, where the cross-section gradually increases, between the lever 2 and the base 4 is about 100 $\mu$m. The base 4 consists, for example, of a wafer of substantially rectangular shape of dimensions 1.6×3.5 mm. This base 4 may comprise, perpendicular to its small sides, several parallel levers 2, as illustrated in FIG. 7. More generally, the levers 2 have a length of between 300 and 500 $\mu$m, a width (the dimension along the direction perpendicular to the plane of FIG. 1) of between 30 and 100 $\mu$m and a thickness e of less than 20 $\mu$m, typically 2 $\mu$m.

The base 4 is about twice as thick as the lever, possibly reaching 40 $\mu$m. The support 5, to which the base is fixed by adhesive bonding or by soldering, may have a thickness of about 380 $\mu$m, which is equal to that of a typical silicon wafer.

Such micromechanical components are used for various applications, two of which will be mentioned as a reminder and to be more specific.

A first application relates to atomic force microscopes which allow the surface of a specimen to be scanned and which produce very accurate images by applying a tip 3 against the surface of the specimen and then by moving it over this surface. The force of application of the tip 3 against the surface is very low, of the order of one nanonewton, and is obtained by elasticity of the beam-forming lever 2, the support 5 being moved by means providing submicron movements. The spring constant of the lever 2 is chosen to be of the order of 1 N/m and the movement is very small. The movements are measured by suitable sensors; in particular, the lever 2 may comprise a reflective film on which a laser beam is directed; the deviation of the reflected beam makes it possible to measure the deformation of the lever 2 and the movement of the tip 3. Such a sensor detects movements to within one angstrom.

For such an application, tips 3 in the form of cones having a small vertex angle are preferably used. For the accuracy and sensitivity of the measurements, it is desirable that the end of the tip 3 have a radius of curvature as small as possible, and less than those of the appliances of the prior art.

The tip 3 may be rendered electrically conductive, which makes it possible to perform electrical measurements and to detect, for example, on the surface of the scanned specimen, an insulating film of regions of different conductivity, and, more generally, to detect certain properties of the material of the specimen whose surface is scanned by the tip 3.

Another application of a micromechanical component of the kind illustrated in FIG. 1 concerns a "nanoindentor" which produces, in the specimen to be studied, a very small-sized indentation (nanoindentation) using the diamond tip 3, in order to measure the hardness of the surface of the specimen. The force exerted on the tip 3 is then higher than that employed in the atomic force microscope application. For this application, it is preferable to use a pyramidal tip 3, that is to say one in the form of an inverted pyramid whose tip is directed downward.

It should be noted that the indentation produced in the second application may be scanned using the atomic force microscope in order to measure the topography.

FIGS. 2A to 2G diagrammatically illustrate the steps in the process for the manufacture of a component 1a (FIG. 2G) with a fine tip 3a and a lever 2a made of diamond, the end of the tip 3a having a radius of curvature markedly less than 100 nm and in particular less than or equal to 20 nm.

The process starts, as illustrated in FIG. 2A, with a p-type double-sided silicon wafer 8a, the thickness of which is, for example, 380 μm. Both faces of the wafer 8a are oxidized in order to obtain a film 9a, 10a of silicon oxide $SiO_2$ on each face.

Next, silicon nitride $Si_3N_4$ is deposited on the two oxide films 9a, 10a. The thickness of the oxide films 9a, 10a may be about 7000 ångströms while the thickness of the nitride film is about 1000 ångströms.

A structuring of the silicon nitride and of the oxide film 10a is carried out on the lower face.

The structuring consists in producing, on the face in question, a photomask, using a suitable photoresist, for the outline of the contour of the regions to be preserved or to be removed, and then in carrying out an etching operation, that is to say etching using a suitable product or means, in order to remove a certain quantity of material from the regions unprotected by the photomask.

After this structuring of the lower face, only the left-end part of the oxide film 10a is still covered with a silicon nitride film 11a (FIG. 2A).

Next, the nitride film is removed from the upper face and the upper oxide film 9a is structured, producing a window 12a having a circular, or substantially circular, contour, towards the right-hand end. The surface of the silicon wafer 8a is therefore no longer protected by the film 9a in the window 12a.

Next, dry anisotropic etching of the silicon is carried out right in line with the window 12a. Such etching may be performed using an RIE (Reactive Ion Etching) plasma, this plasma consisting of a mixture of $CHF_3$, $O_2$ and $SF_6$ in proportions which are experimentally defined in order to have a cavity or impression 13a (FIG. 2B) in the form of a cone whose vertex angle is approximately 10°.

During the next step, illustrated in FIG. 2C, low-temperature oxidation is performed and an oxide film 14a is formed on the wall of the cavity 13a; the thickness of the film 14a is less in the bottom so that the space remaining in the cavity 13a is more pointed after this oxide film 14a has been formed. A photoresist film is deposited on the upper Ra1 and lower Ra2 faces. Next, the upper photoresist film Ra1 is structured so as to define the regions in which the diamond growth will take place.

The main step in the process of the invention then takes place, enabling a diamond tip 3a to be produced, the radius of curvature of the end of which is very small, preferably less than or equal to 20 nm.

Then, in a bath of ethanol which is subjected to ultrasound and in which is suspended a diamond powder, a preparation film composed of fine diamond particles is deposited typically for 30 min. This operation allows diamond particles, the size of which is less than 10 nm, to be deposited on the predefined region of the wafer. The surface density of these particles or seeds is of the order of $10^{10}/cm^2$.

Next, the photoresist films Ra1 and Ra2 are removed. This removes the diamond seeds from the places where the diamond growth does not have to take place.

Next, chemical vapor deposition (CVD) is carried out in a reactor, at a temperature of approximately 850° C., using a plasma composed of $CH_4$ (methane) and $H_2$ (hydrogen) at low pressure (order of magnitude 10 to 100 mbar) and heating the substrate formed by part 8a, the plasma being highly excited, growing the diamond film in order to obtain a film 15a (FIG. 2D).

This film 15a forms, with no discontinuity, the tip 3a and the lever 2a.

Next, the component is removed from the reactor and an operation of etching the oxide film 10a and then the silicon of the wafer 8a is carried out in order to produce a first recess 16a in the silicon beneath the tip 3a, coated with the film 14a, and a second recess 17a lying between the coated region of the silicon nitride film 11a and a central region 18a whose lower face remains covered with the oxide film 10a.

During the next step, which leads to the result illustrated in FIG. 2F, the remaining part of the lower oxide film 10a is removed. The silicon is then etched away from the lower face until revealing, on either side of a silicon central region 19a, which remains, the oxide film 9a.

The oxide film 9a is then etched away on either side of this central region 19a in order to remove this oxide and reveal the tip 3a and the diamond film 15a on either side of the central region 19a. The etching operations are carried out by chemical etching.

A metal film, or combination of metal films, for example a titanium film (Ti) and a gold film (Au) may be deposited on the upper surface of the lever and above the tip 3a. Such a metal film is easier to solder or adhesively bond the component to a support 5 (FIG. 1) and ensures that there is electrical contact with the diamond tip 3a. Furthermore, this metal film may serve as a reflective film for detecting the movement of the tip 3a and the deformation of the lever 2a by deflection of an optical beam, especially a laser beam.

FIGS. 3A to 3F illustrate the steps in the process for producing a component composed of a pyramidal tip 3b (FIG. 3F) and of a lever 2b made of diamond.

The step in FIG. 3A substantially corresponds to that in FIG. 2A and the description will not be repeated. The various parts are denoted by the same reference numbers followed by the letter b, instead of a.

During the step illustrated in FIG. 3B, a photolithographic and etching operation is carried out on the oxide film 9b of the upper face of the wafer 8b in order to define an aperture 12b, having a square contour, in the oxide film 9b.

During the next step, the silicon wafer 8b is subjected to anisotropic etching using potassium hydroxide (KOH) in the window 12b, at a temperature of about 60° C. Such etching progresses at about 14 µm/h and stops on (111) planes of the silicon. The result of this etching, as illustrated in FIG. 3C, is a recess 13b in the form of a square-based inverted pyramid with an apex angle of 70.5°. The etching time depends on the size desired for the tip 3b and therefore for the recess 13b.

During the next step, an etching operation is carried out in the oxide film 9b of the upper face in order to expose the silicon of the lever-forming part 2b.

Next, a primary film of fine diamond particles, as already explained with regard to FIG. 2D, of diameter less than 10 nm, is laid down on the wall of the recess 13b and of the impression corresponding to the lever 2b, in order to act as seeds. The component is put into the reactor for growing the diamond film by vapor deposition. The oxide film 9b prevents nucleation in the regions other than those corresponding to the exposed silicon surfaces of this film. The diamond film 15b (FIG. 3D), which forms, with no discontinuity, the tip 3b and the lever 2b, is obtained.

Next, the lower oxide film 10b is etched and the silicon is etched in order to end up with the configuration of the lower part illustrated in FIG. 3E, similar to FIG. 2E.

Finally, the etching of the oxide in the central region of the lower film lob and the etching of the silicon are continued until complete penetration in order to reach the lever 2b. A central silicon region 19b, corresponding to a doped region allowing the chemical etching to stop at the p-n junction, remains.

The lever 2b associated with a pyramidal tip 3b may have a thickness greater than that of a lever 2a associated with a fine tip 3a, especially because of the higher forces involved when a microindentation is to be made using the pyramidal tip 3b.

FIGS. 4A to 4H refer to the manufacture of a component comprising a fine tip 3c made of diamond and a lever 2c made of silicon. The parts which are similar or analogous to those already described with regard to FIGS. 2A to 2G will be denoted by the same reference numbers, followed by the letter c instead of a, without describing them again in detail.

At the start of the manufacturing process, as illustrated in FIG. 4A, a combination of a silicon wafer 8c, of a thin film 20c of silicon oxide $SiO_2$ formed on one face (the upper face in the case of FIG. 4A) of this silicon wafer, and of a silicon film 21c deposited on this film 20c with a slightly greater thickness than the film 20c is used. By way of indication, the thickness of the film 20c is about 100 nm while the thickness of the film 21c is about 2 to 20 µm.

Both sides are oxidized, leading to silicon oxide films 9c, 10c.

Silicon nitride is deposited on both sides and then both the silicon nitride and the oxide film are structured on the lower face, which leads to the 30 remaining part 11c of silicon nitride and to the silicon oxide film 10c shown in FIG. 4A.

Next, the silicon nitride is removed from the upper face and the oxide film 9c of the upper face is structured. The oxide film 9c, the silicon film 21c and the oxide film 20c are then photo-etched on this upper face so as to obtain the circular-contour window 12c reaching the substrate formed by the wafer 8c.

Next, the silicon of the substrate 8c is anisotropically dry etched through the window 12c in order to obtain the conical recess 13c.

Next, as illustrated in FIG. 4C, a low-temperature oxidation step is carried out, forming an oxide film 14c in the impression 13c. A protective film Rc of photoresist is deposited on the lower face and a protective film 22c of photoresist on the upper face. Next, the upper film 22c of photoresist is structured so as to define the contours of the unprotected region 23c on which the subsequent diamond deposition will take place. The region 23c surrounds the base of the recess 13c. The configuration obtained is that shown in FIG. 4C.

The next step consists in depositing the primary film of fine diamond particles, of a diameter less than 10 nm, in the recess 13c and in the region 23c. The films of photoresist Rc and 22c are then removed.

Next, the component is put into the reactor for growing the diamond film by vapor deposition, as already explained with regard to FIG. 2D. At the end of this operation, the diagram in FIG. 4D is obtained, in which the diamond tip 3c is in the mold defined by the oxide film 14c in the impression 13c. The tip 3c is fastened to a ring-shaped base 24c corresponding to the diamond film which is formed in the region 23c. This ring is bonded to that part of the oxide film 9c lying between it and the silicon film 21c.

Next, the lower oxide film 10c and the silicon of the substrate 8c are etched, as shown in FIG. 4E, in a manner similar to that explained for FIG. 2E.

The etching of the lower oxide film 10c is continued, as is the etching of the silicon of the substrate 8c, with stoppage on the oxide film 20c, which leads to the diagram in FIG. 4F, a central silicon part 19c being preserved.

Next, those regions of the oxide film 20c which lie on either side of the central region 19c and of the upper oxide film 9c in the regions determined by the structuring are removed by etching. The silicon film 21c is then etched, using the oxide film 9c as a mask, in order to obtain the desired contour of the silicon lever 2c. The diagram in cross section of the component at the end of these treatments is illustrated in FIG. 4G.

Finally, the thickness of oxide 9c remaining on the upper face of the silicon lever 2c is removed by etching.

Thus, at the end of the process, the component shown diagrammatically in FIG. 4H, with a silicon lever 2c and a fine diamond tip 3c bonded to that end of the lever 2c remote from the base 4c, is obtained.

FIGS. 5A to 5H relate to the manufacture of a component comprising a pyramidal diamond tip 3d fixed to the end of a silicon lever 2d.

The various films placed on the starting substrate 8d are the same as those mentioned with regard to FIG. 4A and are shown in FIG. 5A, being denoted by the same reference numbers followed by letters d. However, in the case of FIG. 5A, the operation of photolithography and of etching of the oxide film 9d, the silicon film 21d and the oxide film 20d has not yet taken place.

When this operation is completed, the diagram in FIG. 5B, with a square-contour window 12d terminating on the upper face of the silicon substrate 8d, is obtained.

An operation of wet etching (chemical etching using KOH) of the silicon is carried out through this window 12d in order to obtain, as in the case of FIG. 3C, a recess 13d in the form of a square-based inverted pyramid.

Next, the primary film of fine diamond particles, of diameter less than 10 nm, is deposited on the internal surface of the impression 13d and the component is put into the reactor for growing the diamond film by vapor deposition, as explained with regard to FIG. 2D. At the end of this step, the diagram in FIG. 5D, in which the diamond tip 3d is formed in the impression 13d, is obtained, this pyramidal tip 3d being fixed to its base in the silicon film 21d.

FIGS. 5E and 5F correspond to the treatment explained with regard to FIGS. 4E and 4F.

Next, the component is subjected to etching of the oxide film 9d and to etching of the silicon film 21d in the furthermost part lying to the right of the tip 13d. The diagram corresponding to completion of this operation is that in FIG. 5G.

Finally, the etching of the oxide film 9d, in order to remove it completely, and the etching of the oxide film 20d on either side of the central silicon part 19d which remains are completed.

The pyramidal tip 3d has, like the tip 3b, four faces mal<ing an apex angle of 70.5° and constitutes the replica of a pyramid which is obtained by anisotropic etching in the crystalline silicon and defined by (111) planes. The diamond coating forming the pyramid may be rendered conductive by doping, preferably by doping with boron incorporated during the deposition phase. Electrical conductivity has the advantage of avoiding electrostatic forces which could otherwise interfere with the measurements. Conductivity may also detect the state of contact with the specimen or with a conductive part lying under an insulating surface film of the specimen.

As a variant, as illustrated in FIG. 6, the lever 2e may contain a strain gauge 27e formed by a piezoresistive element, lying at that end of the lever remote from the tip 3e and adjacent to the region of embedment of this lever 2e in the base. This gauge 27e is provided on the side of the upper face of the lever 2e and preferably consists of crystalline silicon which is particularly suitable for this function because of its superior mechanical properties and because of its very sensitive piezoresistive response. The strain gauge 27e is protected by an insulating film 28e; a contact film 29e is placed on the protective film 28e which it penetrates at 30e in order to establish contact with the gauge 27e. The film 29e furthermore provides protection against light.

The component formed by the lever 2e and the conical tip 3e in FIG. 6 is more particularly intended for measuring topographical profiles of a surface.

Advantageously, a component formed by a lever 2f and a fine tip 3f (FIG. 7) of the kind described with regard to FIGS. 2G and 4H is integrated on the same wafer 4e as that of the lever 2e. As may be seen in FIG. 7, the two levers 2e, 2f integrated on the same wafer 4e are parallel, being cantilevered from a region of embedment in the wafer 4e. The distance m between the axes of the levers 2e, 2f is about 100 μm.

The contours of the levers 2e, 2f, seen in plan view, are rectangular with parallel longitudinal edges; in the case of the lever 2e, the corners of the external end are cut off. There is a free space 31 between the two adjacent longitudinal edges of the levers 2e, 2f. An aperture 32, for example having a rectangular contour, is provided in the vicinity of the embedded base of the lever 2f, along its axis, in order to increase the torsional sensitivity of the beam formed by this lever 2f.

For measuring the loads exerted on the lever 2f, especially torsional loads, two strain gauges 27f, 27f' are integrated in the vicinity of the base of the lever 25f, in a manner similar to the gauge 27e, on each side of the aperture 32.

A conductive track 33f, especially obtained by doping the silicon substrate of the lever 2f, is provided along the longitudinal axis of the lever in order to connect the electrically conductive tip 3f to measurement means; the track 33f goes around the aperture 32 with a rectangular perimeter.

Similar conductive tracks 33e may be provided on the lever 2e in order to connect a conductive tip 3e to measurement means.

The wafer 4e includes a reference gauge 34e which makes it possible to compensate for the temperature variations in the measurements made using the piezoresistive strain gauges 27e, 27f and 27f'.

It should be noted that the gauge 27e of the lever 2e is placed along its axis, for measurements in bending.

The lever 2e has dimensions, especially a thickness, which are greater than those of the lever 2f since it involves larger forces.

The lever 2f with a fine tip 3f makes it possible to produce images, by atomic force microscopy, of the surface of the specimen and indentations produced with the tip 3e. The lever 2f also allows direct measurement of the depth of the indentation produced by the tip 3e while it is being produced.

The reference gauges may be integrated on the wafer 4e, or alternatively they may project from it, as illustrated in FIG. 7. This second option makes it possible to create cooling conditions for the strain gauges similar to those of the measurement levers.

It is clear that levers and tips other than those described with regard to FIG. 7 may be incorporated on the same wafer 4e.

The strain gauges 27e, 27f, 27f' are produced, during the process of manufacturing the levers, by the p-doping of regions having a depth of 0.5 μm or less, these regions being shown in FIG. 7, in order to obtain the resistive elements. $p^+$-regions are created for the electrical contacts of the piezoresistive elements. $n^+$-regions are defined for the electrical contact with the substrate. The conductive tracks making it possible to establish electrical connections between the tips and the resistive elements of the strain gauges with the measurement appliances may also be produced by deposition of conductive metal films.

The tips 3f and 3e are produced sequentially, the fine tip 3f first and then the pyramidal tip 3e.

The combination of the two tips 3e and 3f on levers embedded in the same wafer 4e has the advantage of allowing measurement of the depth of the indentation while measuring the difference in the bending of the two levers 2e, 2f during indentation.

The two levers 2e, 2f may be manufactured either simultaneously from the same wafer 4e or separately, to be subsequently joined together to the same wafer 4e.

The components 1 and their supports 5 (FIG. 1) are produced in batches of several components and supports.

As illustrated in FIG. 8A, each support 5 is inside a rectangular empty cell 35 defined by branches 36, 37 of a grid 38 forming a Support frame.

The representation in FIG. 8A is on a highly enlarged scale, the dimensions of the cell 35 being about 5 mm×8 mm.

The support 5, already described with regard to FIG. 1, has a rectangular shape with cut-off corners, the length of which is placed so as to be parallel to the long sides of the cell 35. The center of the support 5 coincides with the center of the cell 35. The long sides of the support 5 are connected to the longitudinal branches 37 by arms 39 having a region 40 of smaller size at the junction of the support 5 in order to facilitate, by snapping, the separation of the support 5 from the arms 39. The two arms 39 on either side of the support 5 lie in the extension of each other, parallel to the short branches 36 of the grid and are offset to one side, toward the left in FIG. 8A, with respect to the mid-perpendicular of the long sides of the cell 35. FIG. 8A shows, by means of a darker region inside the contour of the support 5, the surface provided with adhesive or with solder for fixing the wafer 4, illustrated in FIG. 8B, to the support 5.

The wafer 4, already described with regard to FIG. 1, has a contour similar to that of FIG. 5. Several levers such as 2, 2h (see FIG. 6) or 2g project from the short sides of the wafer 4, in a direction perpendicular to this short side. The lever 2g is V-shaped and has two arms coming together at the tip of the V where the diamond tip is, while the opposite ends of these arms are embedded in the wafer 4; such a lever with two arms 2g provides better torsional stability.

In practice, a single lever remains cantilevered from a short side of the wafer 4.

The wafer 4 lies in an empty cell 35a similar to the cell 35 of FIG. 8A, located inside a grid 38a whose branches 36a, 37a surround the wafer 4 at a distance. The latter is connected, on its long sides, to arms 39a which are narrower and thinner than the arms 39 in FIG. 8A. The arms 39a are offset to the right in FIG. 8B with respect to the mid-perpendicular of the longitudinal branches 37a. Snap regions 40a are provided at the junction of the arms 39a with the long sides of the wafer 4.

After having prepared separately a grid 38 comprising the supports 5 and a grid 38a comprising the wafers 4 with their levers, and after having placed the films of adhesive or solder under the supports 5, the grid 38 is applied against the grid 38a, as illustrated in FIG. 8C so that each support 5 covers an associated wafer 4. FIG. 8C shows, by means of dot-dash lines inside the contour of the support 5, the surface provided with adhesive or solder in order to fix the wafer 4, illustrated in FIG. 8B, to the support 5.

When bonding has been established, by setting of the adhesive or solidification of the solder, between each wafer 4 and its corresponding support 5, it is possible, separating the grids 38 and 38a, to snap the arms 39a of lower strength and to obtain a grid 38 comprising, inside each cell 35, a support 5 to which a wafer 4 is fixed. Next, each support 5 may be removed individually from its cell 35 by snapping the arms 39.

FIG. 9 shows a component 1 h with a fine diamond tip 3h forming a novel type of electron source. The tip 3h is of the same kind as the fine tips 3a, 3c described previously and constitutes a cathode. The n-type film on the p10 type silicon substrate 8h and the cavity 13h forming the mold are defined in such a way that the p-n junction making it possible to stop the etching or electrochemical etching is at a level s lying in the vicinity of or above (according to the representation in FIG. 9) of the end q of the tip 3h.

After the previously described steps in the process, a p-doped film 41 is implanted into the surface of the substrate 8h at level s in order to act as a p-type extraction electrode. A positive voltage applied between the extraction electrode and the diamond tip 3h (cathode) makes it possible to extract an electron current from this tip.

The tip 3h is electrically conductive and the contact electrode 42, shown in FIG. 9, lies on the opposite side to the end q.

The advantages of this novel structure are the following:
self-aligned extraction grid/tip geometry;
low voltage since the extraction gap is defined by the oxide thickness;
it is possible to integrate electronic elements into the wafer, which is advantageous, for example, in order to make each emitter operate at well-defined current levels;
the technique of molding and of manufacturing the diamond tip 3h enables a particularly sharp-pointed tip to be obtained.

Many applications are possible, such as the detection of magnetic fields, vacuum microelectronics and flat-panel displays.

We claim:

1. A process for manufacturing micromechanical components having a part made of diamond including a diamond tip, in particular a process for manufacturing a micromechanical detector or an comprising the steps of:
   forming an impression of substantially the desired shape for the diamond tip in a substrate;
   forming an oxide film on the wall of said impression;
   depositing on said oxide film a primary film of diamond particles suitable for acting as seeds for growth of diamond,
   growing a diamond film in said impression by vapor deposition; and
   at least partially removing said substrate and said oxide film from said diamond film.

2. The process as claimed in claim 1, wherein a diamond film having a thickness of the order of 1 micrometer is produced.

3. The process as claimed in either of claims 1 or 2 for the manufacture of a component comprising a lever having a diamond tip at one end, the lever itself being made of diamond, wherein said impression includes a portion substantially in the form of said lever, said primary film of diamond particles being deposited over the entire surface of the impression, including that corresponding to the lever, and said diamond film is grown over the entire surface of the impression, such that the lever and the tip are produced as a single piece.

4. The process as claimed in either of claims 1 or 2 for the manufacture of a component comprising a lever having a diamond tip at one end, wherein the lever includes a non-diamond film, said non-diamond film forming part of the substrate and being penetrated by the impression before deposition of the diamond so that the diamond tip is bonded to said non-diamond film after deposition of the diamond in the impression.

5. The process as claimed in claim 4, wherein the non-diamond film is formed of the same material as the substrate, and is placed against one face of the substrate, from which it is separated by an intermediate oxide film.

6. The process as claimed in claim 4, wherein the substrate is silicon, and wherein the non-diamond film consists of silicon making up part of the substrate.

7. The process as claimed in claim 6, wherein the silicon film forming the lever is doped with boron, in order to stop the chemical etching of the silicon, during removal of part of the substrate.

8. The process as claimed in claim 3 wherein said impression forming step includes the steps of delimiting a substantially circular window on one face of the substrate by a mask, and producing an impression in the form of a pointed cone by dry etching of the substrate through said window.

9. The process as claimed in claim 1, wherein said impression forming step includes the steps of delimiting a square window by a mask on one face of a silicon substrate, and producing an inverted pyramidal impression of the silicon substrate.

10. The process as claimed in either of claims 1 or 2, wherein after growing of the diamond film such diamond film is covered with a support structure, or a bond is established between this diamond film and an appropriate support.

11. The process as claimed in either of claims 1 or 2, wherein the substrate is made of silicon or of silicon oxide.

12. The process as claimed in claim 1, wherein the diamond film is rendered electrically conductive.

13. The process as claimed in one of claims 1 to 11, wherein the diamond film is rendered electrically insulating.

14. The process as claimed in claim 1 wherein said tip has an end having a radius of curvature less than or equal to 20 nanometers.

15. The process as claimed in claim 4 wherein said impression forming step includes the steps of delimiting a substantially circular window on one face of the substrate by a mask, and producing an impression in the form of a pointed cone by dry etching of the substrate through said window.

* * * * *